United States Patent

Jack et al.

Patent Number: 5,915,244
Date of Patent: Jun. 22, 1999

[54] COMPUTERIZED INCENTIVE PROGRAM WITH PLATEAU PRICING AND REMOTE AWARD REDEMPTION

[75] Inventors: John M Jack, Wayzata; Yuanita A Carson-Gamauf, Prior Lake; Stephanie A Binzen, Minnetonka, all of Minn.

[73] Assignee: BI Performance Services, Minneapolis, Minn.

[21] Appl. No.: 08/775,493

[22] Filed: Dec. 31, 1996

[51] Int. Cl.⁶ .................................................. G06F 15/21
[52] U.S. Cl. ............................................................ 705/14
[58] Field of Search ................................... 705/1, 10, 11, 705/14; 235/380

[56] References Cited

U.S. PATENT DOCUMENTS

| | | | |
|---|---|---|---|
| 4,949,256 | 8/1990 | Humble | 705/10 |
| 5,025,372 | 6/1991 | Burton et al. | 705/14 |
| 5,202,826 | 4/1993 | McCarthy | 705/14 |
| 5,483,444 | 1/1996 | Heintzeman et al. | 705/10 |
| 5,537,314 | 7/1996 | Kanter | 705/14 |
| 5,687,322 | 11/1997 | Deaton et al. | 705/14 |
| 5,689,100 | 11/1997 | Carrithers et al. | 235/380 |
| 5,734,838 | 3/1998 | Robinson et al. | 705/14 |

OTHER PUBLICATIONS

"A La Carte Awards®", Procedures Manual, Cover page, pp. 1–11 and 4 pages of sample forms.
"Affidavit of Stephanie Binzen", 1 page (May 13, 1997).
"AwardbanQ® Procedures", Procedures Manual, Cover page, pp. 1–17 (Apr. 1993).
"Awardgame™—Information and Procedures", Procedures Manual, Cover page, pp. 2–29 (Jun. 1992).
"AwardperQs™ Procedures", Procedures Manual, Cover page, pp. 1–10.
"AWARDPERQS VR™", Procedures Manual, pp. 1–14.
"Plateau Procedures", Procedures Manual, Cover page, pp. 1–10.
"The Summit Collection®—Procedures", Procedural manual, 12 pages and 4 pages of sample forms (Dec. 1993).
"Your Privilege® Awards", Procedures Manual, 15 pages and 5 pages of sample forms.

Primary Examiner—Eric W. Stamber
Assistant Examiner—Hani M. Kazimi
Attorney, Agent, or Firm—Schwegman, Lundberg Woessner & Kluth P.A.

[57] ABSTRACT

A computerized incentive program having plateau pricing and a personalized bank-account system, and permitting remote award redemption is disclosed. In one embodiment of the invention, a computerized incentive-program system includes a pricing component, which converts a price of each of a plurality of awards into award levels such that each price within a particular price range is converted to a single award level. The system also includes a bank account component, which tracks an award balance for each of a plurality of participants and permits each participant to redeem at least a portion of the award balance for an award. Finally, the system includes a certificate component, which permits a program participant to remotely redeem a certificate having a value at least a portion of the award balance by identifying a serial number unique to the certificate, upon conclusion of the incentive program.

13 Claims, 15 Drawing Sheets

| BALANCE LAST STATEMENT | DEPOSITS | WITHDRAWALS | ADJUSTMENTS | BALANCE THIS STATEMENT |
|---|---|---|---|---|
| | | | | |

| DATE | REASON | DEPOSITS | WITHDRAWAL | ADJUSTMENTS |
|---|---|---|---|---|
| | | | | |

| | SUPERVISOR NAME |
|---|---|
| | |

STATEMENT

AWARDPERQ® DEPOSIT SUMMARY

| ACTIVITY | ACTIVITY MONTH | CREDITS EARNED | ACTIVITY | ACTIVITY MONTH | CREDITS EARNED |
|---|---|---|---|---|---|
| | | | | | |
| | | | TOTAL CREDITS | | |

FIG. 3(b)

RESPONSE: _____    AWARDPERQ CALLER IDENTIFICATION    BOE905M

AWARDPERQ CARD NBR: _____    ORDER TYPE: ___ (MERCHANDISE OR TRAVEL)
                               MERCH ORDER NBR: ___ SERVICE NBR: ___
CREDITS AVAILABLE: _____     TRAVEL ORDER NBR: ___ SERVICE NBR: ___
TYPE OF ORDER: _____         ORDER STATUS: ___
CLIENT: _____                                CP#: ___
PROGRAM: _____
CAMPAIGN: _____
PARTICIPANT ID: _____
    NAME: _____                                    SSN: _____
    PHONE: _____    EXT: _____
    ADDRESS: _____
CITY: _____
STATE: _____        COUNTRY: _____
ZIP: _____
    ADDRESS TYPE: _____                 ADDNL ADDRESSES: _____

PF19=RESELLER PF10=ORDPROC PF13=BWDPROG PF17=ACCORDER PF18=CERTIFICATE RANGE
ENTER=CALLERID PF4=NOTES PF7=BWDADDR PF11=CASHCC PF14=ACCESS PF21=AWDCONC
PF1=ADDOADDR PF6=ORDITEM PF8=FWDADDR PF15=ORDHIST FR16=ORDSHIP PF9=PAXLIST

FIG. 5

```
RESPONSE: _____        AWARDPERQ ORDER ITEM SHIP TO ADDRESS              B0E565M

ORDER NBR _____ STAT ___ PARTICIPANT _____
ORDER DTE _____ DTE ___  PHONE _____ EXT ___ TYPE ___
MERCH _____ CP# _____  CLIENT _____

S H I P  T O  NAME _____
              ADDRESS _____                    ADDRESS TYPE _____

CITY _____
              STATE _____      COUNTRY _____
              ZIP _____
              PHONE D _____            EXT ___ E
              SHIPPING ADDR TYPE: ___
WAREHOUSE SHIPPING INSTRUCTIONS: _____
DELIVERING CARRIER INSTRUCTIONS: _____
    CUSTOMER ID: _____       IS THERE SPECIAL INSTRUCTIONS FOR D/S ? ___
ENTER=ORDSHIP  PF2=CHGSADDR  PF5=CALLER ID  PF10=ORDPROC  PF13=CLRSADDR
PF1=ADDSADDR   PF3=HELP  PF6=ORDITEM  PF11=CASHCC
```

FIG. 6

RESPONSE: _____ AWARDPERQ ORDER ITEM                                          BOE912M

ORDER NBR _____ STAT ____ PARTICIPANT _____
ORDER DTE _____ DTE _____ SHIP (H) ____ (W) ____ EXT ____
MERCH ____ CP# _____ CLIENT _____
          ITEM                              CREDITS  STK  ITEM LN  AD B SI
S  LN  NUMBER  QTY  ITEM NAME/ADDNL INFO    REQUIRED TYP  STAT ST  IN O CO
_____ _____ ____ _____ _____ ___ ____ __ __ _ __
***********************************************************************
                                 UNIT
ITEM AVAIL QTY: _____ ON ORD QTY: _____ ITEM EXTENDED WEIGHT: _____
B/O SHIP DATE _____ D/S WKS ____ MORE B/O INFO: ____ CAT # ____ PAGE ____
TYPE REQUESTED = ____ ORDER: ____ CUST SVC: ____ MDSE: ____

_____ CREDITS AVAIL _____ TOTAL ORDER WEIGHT _____ SUP CR _____
                              CREDIITS REQUIRED _____ DIFF _____
ENTER=ADDOITEM  PF7=BWDOITEM  PF11=CASHCC  PF15=ORDHIST  PF16=ORDSHIP  PF18=ADNLFWD
PF2=CHGOITEM   PF5=CALLERID  PF8=FWDOITEM  PF13=OPEOITEM  PF17=ADNLBWD  PF19=CERTRNG
PF3=HELP       PF6=ORDITEM   PF10=ORDPROC  PF14=BOITEM    PF22=ITMSUFIX  PF20=ITMADDL

FIG. 7

RESPONSE: AWARDPERQ ORDER PROCESSING                                    BOE599M

ORDER NBR _____  STATUS ____  CLIENT _____
ORDER DTE _____  DTE ____     PROGRAM _____
MERCH _____  CP# ____  PARTICIPANT _____
F U N D S :           CREDITS     CASH VALUE     CARD # _____  SHIP TO: _____
  A LA CARTE    _____  _____  _____        _____         _____
  AWARD CHECKS  _____  _____  _____        _____         _____
  COUPONS       _____  _____  _____        #_____        _____
  BANK ACCOUNT  #_____ _____  _____        PHONE: H _____ EXT ____
  SUPP CR       _____  _____  _____               W _____

* TOTAL REQD  *_____                           I T E M S :  NO OF LINES _____
* TOTAL RCVD  *_____
  DIFFERENCE   _____                           BALANCE AFTER THIS ORDER _____
  ADJUSTMENTS  _____
  REFUND       _____
* BALANCE     *_____                           FIRST BANK ACCOUNT: _____

ENTER=ORDPROC(INQUIRE)  PF3=HELP   PF5+CALLERID   PF11=CASHCC  PF24=WHATIF
PF1=PROC        PF4=NOTES          PF6=ORDITEM    PF16=ORDSHIP

FIG. 8

```
RESPONSE: INQPBAL                AWARDPERQ BALANCE SCREEN                              BOE730M
                                                                            07/12/96 7:15:37
SEQUENCE NBR: 029587                                              NEXT AVAIL SEQ NBR: 032063
        ORDER: 00000         CREATED: 05 06 96                      BY USER: UHRICH2

CERT      SEL AVAIL PERQS  ISS PERQS  STAT  CUST-PROG   ISS DATE   ST DATE   ER
01386194   –     0     15    IS       1901 0701        03 14 96   03 14 96   Z
01059872   –     0     15    IS       1901 0701        12 01 95   12 01 95   Z
00000000   –     0     15            0000 0000
00000000   –     0     15            0000 0000
00000000   –     0     15            0000 0000
00000000   –     0     15            0000 0000
00000000   –     0     15            0000 0000
00000000   –     0     15            0000 0000
00000000   –     0     15            0000 0000
00000000   –     0     15            0000 0000
00000000   –     0     15            0000 0000
00000000   –     0     15            0000 0000

AVAILABLE PERQS:                                                  PAGE 001 OF 006
PF1=ADD PF2=MOD PF3=HELP PF5=MEDIA PF7=BCK PF8=FWD PF9=RMVCRT PF13=CLR
900663 FIRST PAGE OF SEQUENCE RECORD 029587 DISPLAYED
```

FIG. 12

RESPONSE: INQPOPL        AWARDPERQ CERTIFICATE TRANS LIST - OP        BOE731M
                                                              07/12/96 7:11:35

CERTIFICATE NUMBER: 00833 057    ISSUED:     DATE: 06 20 95        1 PERQS
CUST-PROG: 01802 0701            STATUS: IS  DATE: 06 21 95        0 PERQS

TY/           CREATE                              UPDATE
TRANS  PERQS CO   DATE     TIME    USER      DATE              TIME    USER

409337  -1   MD  07/03/96 13:32:49 BRANDT   07/03/96         13:35:03 BRANDT
             FF
         0
         0
         0
         0
         0

PF3=HELP   PF7=SCROLL FORWARD   PF8=SCROLL BACKWARD
900663 AWARDPERQ CHECK DETAIL INFORMATION IS DISPLAYED

FIG. 13

COMPUTERIZED INCENTIVE PROGRAM WITH PLATEAU PRICING AND REMOTE AWARD REDEMPTION

FIELD OF THE INVENTION

The present invention relates generally to a computerized incentive program, and more particularly to such a program having plateau pricing and a personalized bank-account system, and permitting remote award redemption.

BACKGROUND OF THE INVENTION

Incentive programs are typically offered by sponsoring companies to promote the sales of their products or services, or to improve the performance of their employees. Employees participating in incentive programs usually receive credits that can be accumulated and exchanged for merchandise in award catalogs, or for travel awards. The selling prices of individual items of merchandise are therefore stated as credit values instead of in dollar amounts.

Stating prices in terms of credit values is meant to deter program participants from comparing the cost of individual items of merchandise found in award catalogs with their prices at retail. Because the incentive companies running the incentive programs provide significant services (such as consulting, program design, home delivery of merchandise, etc.), the prices of merchandise in the award catalogs are typically higher than those featured by retail stores. Participants, not recognizing the costs necessary to administer the incentive program, may believe that the incentive companies as well as the program sponsors are benefitting unjustly by marking up prices higher than retail prices. Unfortunately, participants are nearly always able to deduce the cost of credits, by comparing item-for-item costs with retail prices of identical items. This price-perception problem is a significant disadvantage to such incentive programs.

Incentive programs in which participants are awarded credits are typically administered in one of two ways. First, credits may be tracked by a computerized bank account reward system. Such a computerized system permits reporting to the participants of the number of credits that were awarded at certain periods during the program, and advising the participants how many more credits remain (i.e., unused credits). Each participant typically has a "personal bank account" into which credits are automatically deposited. Participants usually order awards by calling a toll-free number.

Computerized bank account reward systems, however, are expensive to administer. Every month during which an incentive program is running, the sponsor of the program typically must pay the incentive company for administering the program. Furthermore, at the end of the incentive program period, the credits earned by the participants are lost if they have not been already redeemed for awards. Both of these aspects of computerized bank account reward systems are significant disadvantages.

A second manner in which credits in an incentive program may be issued is through the use of certificates. In a certificate incentive program system, credits are mailed to the participant in the form of certificates. Each particular certificate has a credit value (e.g., one, five or ten credits for a given certificate). When a participant has received enough certificates to receive an award, the participant mails in the certificates to redeem them for the award. Certificates, however, are frequently unwieldy to redeem, and add delay into the award redemption process. Mailing the certificates in for redemption forces the program participant to wait even longer to receive an award, because of the time required for the certificates to reach the redemption center through the mail.

There is a need, therefore, for a computerized incentive program system that overcomes all the above-described disadvantages. That is, there is a need for a computerized incentive program system that awards credits to program participants but which overcomes the price-perception problem encountered in such programs, while also overcoming the disadvantages of the bank account systems and certificate systems used to administer the programs.

SUMMARY OF THE INVENTION

The present invention relates to a computerized incentive program having plateau pricing and permitting remote award redemption. In one embodiment of the invention, a computerized system includes a pricing component that conglomerates the prices of individual items of merchandise within price groupings, or "plateaus". This provides the advantage of not permitting program participants to determine the effective price of award merchandise.

For example, each item that would normally be priced in credits worth anywhere from fifteen to forty dollars is placed in a single plateau or award level. The system also calculates shipping costs and applicable sales taxes, and incorporates them into the plateau pricing. Thus, a wide range of merchandise items in various price ranges are valued identically. Items available at one award level, which may be valued at twenty-five dollars, may have sold for between fifteen and forty dollars in conjunction with traditional computerized incentive programs.

This embodiment of the invention also includes a bank account component and a certificate component. The bank account component permits electronic tracking of an award balance for each participant, and permits the participants to order awards by calling a toll-free number. The certificate component issues a certificate to each participant at the end of the program for the remaining unused award balance of the participant. The certificates need not be mailed to the redemption center for redemption, as they are each identified by a unique serial number, which the participant reads over the phone when placing an order. The participants are able to redeem the certificates by calling a toll-free number (i.e., remotely).

The combination of a bank account component with a certificate component provides for a number of advantages. The administration costs incurred in conjunction with the bank account component are kept to a minimum because after a program is over, the award balances of the participants are converted to certificates. Thus, once the participants receive certificates, the bank account component no longer needs to be maintained. Furthermore, the participants do not lose any of their credits at the end of a program, because the credits are converted to unique "one-way" certificates that are redeemable over the phone. The ability to call in the certificates means that the participants also do not encounter the delays that result when mailing in certificates.

Still other and further embodiments, aspects, and advantages of the present invention will become apparent by reference to the drawings and the following description of the invention.

BRIEF DESCRIPTION OF THE DRAWINGS

FIG. 3(b) is a representative activity statement generated by the sub-component of FIG. 3(a);

FIG. 5 is a caller identification screen shown to an operator in conjunction with the sub-component of FIG. 4;

FIG. 6 is an order screen shown to and filled in by an operator in conjunction with the sub-component of FIG. 4;

FIG. 7 is a further order screen shown to an operator in conjunction with the sub-component of FIG. 4;

FIG. 8 is yet a further order screen shown to an operator in conjunction with the sub-component of FIG. 4;

FIG. 12 is a balance screen shown to an operator in conjunction with the sub-component of FIG. 11; and, FIG. 13 is a certificate transaction screen shown to an operator in conjunction with the sub-component of FIG. 11.

DETAILED DESCRIPTION OF THE INVENTION

The present invention relates to a computerized incentive program having plateau pricing and a personalized bank-account system, and permitting remote award redemption. In the following detailed description, reference is made to the accompanying drawings which form a part hereof, and in which is shown by way of illustration specific embodiments in which the invention may be practiced. It is to be understood, however, that other embodiments may be utilized and structural changes may be made without departing from the scope of the present invention.

This detailed description is organized into five parts. First, an overview of the present invention is provided. Second, a description of a pricing component of the invention is provided. Third, a description of a bank account component of the invention is provided. Fourth, a description of a certificate component of the invention is provided. Finally, a conclusion is provided.

Overview of the present invention

Figure 1A:
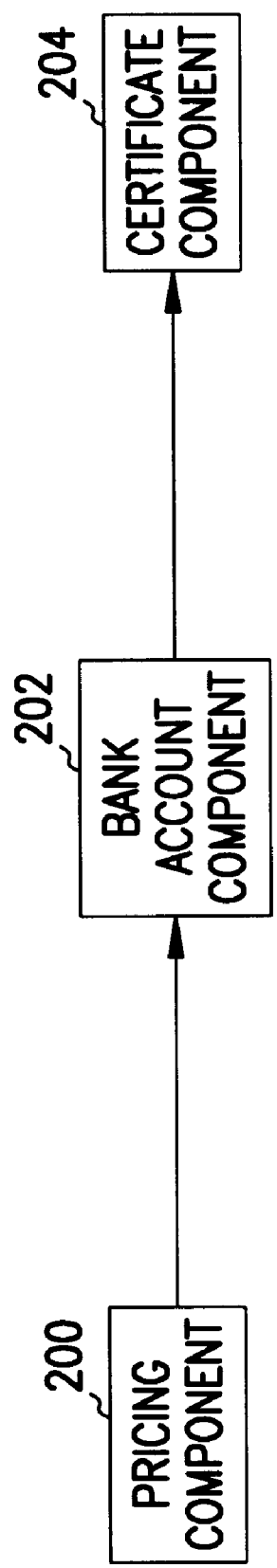
FIG. 1(*a*) is a block diagram of a computerized incentive program system according to an exemplary embodiment of the invention.
FIG. 1(b) is a block diagram of a computer in conjunction with which one or more components of FIG. 2(a) may be implemented.

A general block diagram of a computerized incentive program system in accordance with an embodiment of the present invention is shown in FIG. 1(a). Referring now to FIG. 1(a), the computerized incentive program system comprises pricing component 200, bank account component 202, and certificate component 204. Pricing component 200 converts a price of each of a plurality of awards into a number of award levels, such that a variety of prices within a particular price range is converted to a single award level. The pricing component provides the invention with the advantage of not permitting participants to determine the effective price of award merchandise. For example, all award merchandise within the fifteen to forty dollar range may be priced at the same award level.

The pricing component is invoked at the beginning of an incentive program, or at any time during the program when new merchandise is added as an award choice to participants. After pricing component 200 has been run for at least an initial set of award merchandise, bank account component 202 is executed. Bank account component 202 tracks an earnings balance for each of a plurality of program participants, and permits the participants to redeem at least a portion of their earnings for an award. For example, a participant is able to call a toll-free number to determine the earnings remaining in the participant's account, and how much of the earnings have already been redeemed for awards. Bank account component 202 also mails regular activity statements to the participants showing this information.

The bank account component is run during the course of an incentive program. That is, while an incentive program is running in which participants are able to receive award earnings, the bank account component permits the participants to keep tabs on their personal accounts (i.e., earnings balances), and redeem awards. Once an incentive program has been completed—that is, once participants are no longer able to receive award earnings—certificate component 204 is executed. Certificate component 204 closes out each participant's electronic bank account at the end of an incentive program, by issuing to each participant a certificate for the earnings remaining in his or her bank account. Certificate component 204 assigns each certificate a unique serial number, and permits the participants to redeem one or more certificates for awards by calling a toll-free number and identifying the certificates by serial number.

The operation of components 200, 202 and 204 in conjunction with an incentive program is as follows. A program sponsor contracts with an incentive company for the incentive company to administer an incentive program for the program sponsor. The sponsor and the incentive company decide on the start and finish dates of the program, as well as which merchandise will be offered for award redemption to the program participants of the sponsor. The sponsor and the incentive company also agree on the price at which each award point will be sold to the sponsor by the incentive company, for awarding to the employees of the sponsor. Note that the employees are not made aware of the cost of these award points. In an exemplary embodiment of the invention, award points are priced at $0.25, $2.50, or $25.

Pricing component 200 is then run on the award merchandise selected by the sponsor and the incentive company, to price the merchandise into a number of different award levels. Each award level is associated with a particular number of award points necessary for redemption for an award within that award level. In an exemplary embodiment of the invention, these award levels are associated with multiples of ten award points (10, 20, 30, 40, et seq.). Thus, a program participant requires ten award points to redeem to obtain an award in the award level associated with ten award points, twenty award points to obtain an award in the award level associated with twenty award points, etc.

Note that this does not mean that the awards in the award level associated with ten award points, for example, cost 10 points*$2.50 per point=$25. The price per award point paid by program sponsor to the incentive company does not necessarily correlate to the price of the awards within an award level. For example, the award level associated with ten award points may include award merchandise that costs anywhere in the range of $15–40. This means that program participants cannot discern the price of any merchandise based on the number of award points necessary for redemption to obtain that merchandise.

Once pricing component 200 is run, bank account component 202 is executed in conjunction with the running of the actual incentive program. During the course of the incentive program, each program participant is provided award points (i.e., earnings) in conjunction with the happening of an event which the program sponsor desires to provide an incentive for. For example, a salesperson may receive earnings when selling a particular quota of goods in dollar value or in quantity. Bank account component 202 apprises the participants of their earnings via regular activity statements and by calling a toll-free number, and also permits the participants to redeem their earnings for awards by calling a toll-free number.

The incentive program is "over" when the program participants are no longer able to earn award points. Thus, when the program is over it is not necessary nor economical to keep bank account component 202 running, because the participants cannot earn additional points. Although in the program participants may be asked to redeem earnings by the end of the program, usually many participants still have earning balances at that time. So that these participants do not lose their earnings, certificate component 204 is run.

Figure 1B:
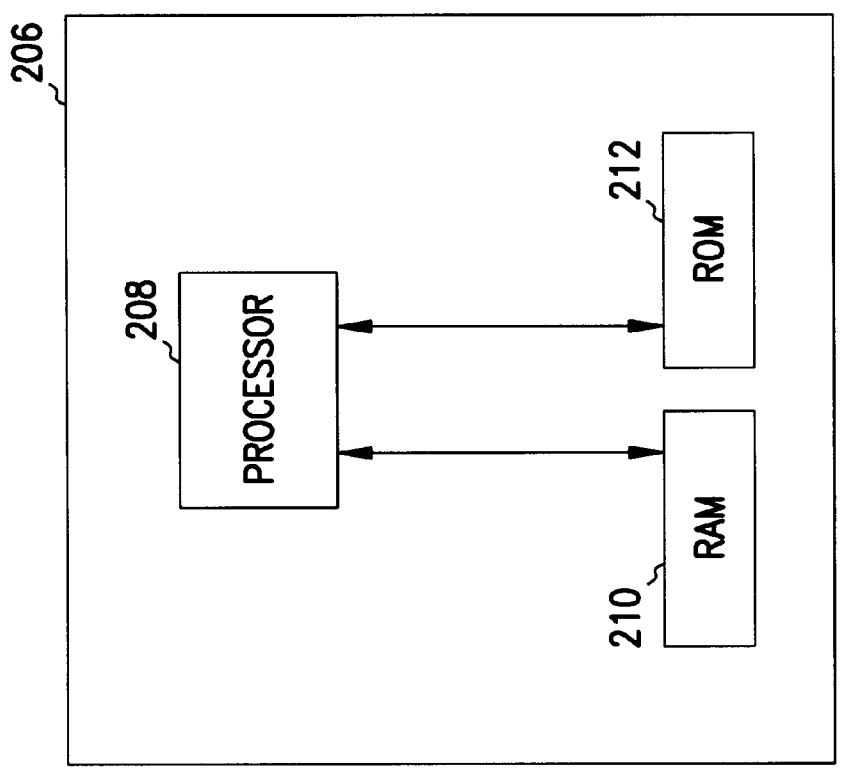

Each of components 200, 202 and 204 is implemented on a computer in conjunction with computer hardware programmed by software. Each component may be software programming the same hardware, or may be software programming different hardware. For example, pricing component 200 may be run on a different computer than certificate component 204, or they may be run on the same computer. In an exemplary embodiment, the components are run on different computers. The computers in one embodiment are mainframe computers such as an IBM ES9000, operating within a networked environment permitting multiple users to access the data stored thereon at any one time, via remote terminals or computers having input devices and typically display devices. A diagram of such a computer is shown in FIG. 1(b). As those of ordinary skill within the art understand, such a computer 206 typically includes at least one processor 208, random-access memory (RAM) 210, and read-only memory (ROM) 212. Not shown is that computer 206 typically also includes a fixed storage device such as a hard disk drive, and a removable storage device such as a tape cartridge device. In an exemplary embodiment, the hardware of the computer is programmed in software via the IDMS ADSO programming language.

Pricing component

Figure 2:
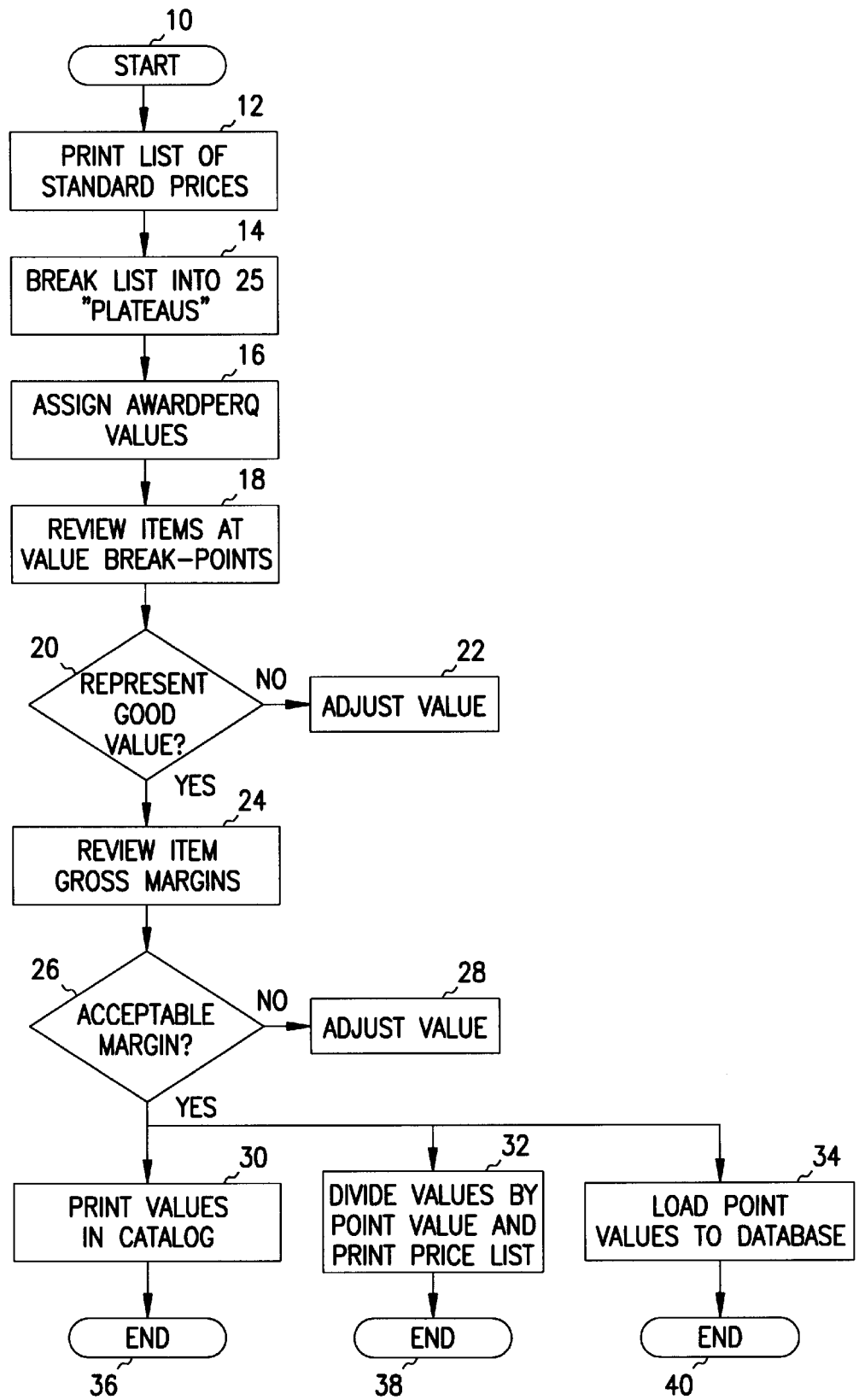
FIG. 2 is a flow chart showing a pricing component of a computerized incentive-program system according to one embodiment of the invention.

A flow chart effectuating a pricing component of a computerized incentive-program system according to one embodiment of the present invention is shown in FIG. 2. The pricing component converts a price of each of a plurality of awards into a number of award levels, such that a variety of prices within a particular price range is converted to a single award level. The pricing component provides the invention with the advantage of not permitting participants to determine the effective price of award merchandise. The pricing component is invoked at the beginning of an incentive program, or at any time during the program when new merchandise is added as an award choice to participants.

Starting at step 10, control proceeds to step 12, at which step a list of standard prices for award merchandise is displayed. The standard price for a particular award item is typically its retail or invoice price, plus necessary overhead expenses that are incurred in administering the award program. Thus, the standard price is usually greater than the price which a consumer may expect to pay for a similar item in a retail setting. Control proceeds from step 12 to step 14, at which step the list of standard prices is divided into different price ranges, such as successive twenty-five dollar ranges (i.e., $15–40, $41–65, $66–90, et seq.). Control proceeds to step 16, at which step award levels are assigned to each price range (i.e., level one for the $15–40 range, level two for the $41–65 range, et seq.). Steps 12, 14 and 16 are performed by the computer hardware, as dictated by the computer software, of the computerized system.

Control proceeds from step 16 to step 18. At step 18, an analyst reviews the price range into which each item of merchandise was placed at step 14, as well as the award level assigned to each item. This is necessary because items priced near the break points between successive ranges (i.e., an item priced at $39, or $42) may not represent good values as compared to the other items that have been placed in the same award level. Control thus proceeds from step 18 to step 20, at which step the analyst reviews each item for value. If the award level assigned to an item does not represent a good value, it is adjusted at step 22. For example, an item priced at $41 may have been placed at level two, but may not represent as good a value as other items assigned to level two. Therefore, the award level assigned to this item may be adjusted to level one. Steps 18, 20 and 22 are performed by the analyst in interaction with the computerized system.

Once all the items have been reviewed for value, control proceeds to step 24. At step 24, an analyst (either the same analyst as at 18, or a different analyst) reviews each item of merchandise to determine if its gross margin is acceptable. For example, an item priced at $39 placed in a $15–40 price range may not afford an adequate gross margin because it is priced near the high end of the price range. Therefore, such an item is bumped up to the $41–65 price range, and has its award level increased accordingly. This is accomplished by the procession of control from step 24 to step 26, at which step the analyst reviews each item for an acceptable gross margin. If it is unacceptable, the award level accorded the item is adjusted at step 28. Steps 24, 26 and 28 are performed by the analyst in interaction with the computerized system.

Once all the items have been reviewed for an acceptable gross margin, control proceeds to each of steps 30, 32 and 34. At step 30, the award levels for the merchandise items are printed in an awards catalog, and control proceeds to step 36, at which step the pricing component ends. The awards catalog is then distributed to participants of the incentive program, so that they know what awards are being offered through the incentive program, and the award level that must be obtained to earn a particular desired merchandise item.

In some incentive programs, a smaller award unit is required for rewarding lesser activities. For these programs, at step 32, the award values are all divided by the dollar amount accorded to an award level, for publication in a price list. The price list is used instead of referencing the award level printed in an awards catalog. Control proceeds from step 32 to step 38, at which step the pricing component ends.

At step 34, the values for the merchandise items are loaded into a database, for later access by the computerized system. For example, when a participant calls into a redemption center to redeem their program earnings for an award, the computerized system will verify that the participant has a sufficient earnings balance to obtain a particular award. This is accomplished by accessing the database. Control proceeds from step 34 to step 40, at which step the pricing component ends.

The pricing component of a computerized incentive-program system according to the present invention is a great advantage. By eliminating dollar-based pricing, the invention focuses eligible participants not on how much any given award is worth in dollars, but rather on which awards are most appealing to their personal tastes and lifestyle. This greatly encourages "imaging" of themselves enjoying the awards, and subsequent goal setting on how to go about achieving that specific award. In most programs, the award level of each catalog item is shown next to a picture of the item. A participant does not have to reference a separate price list.

Bank account component

Figure 3A:
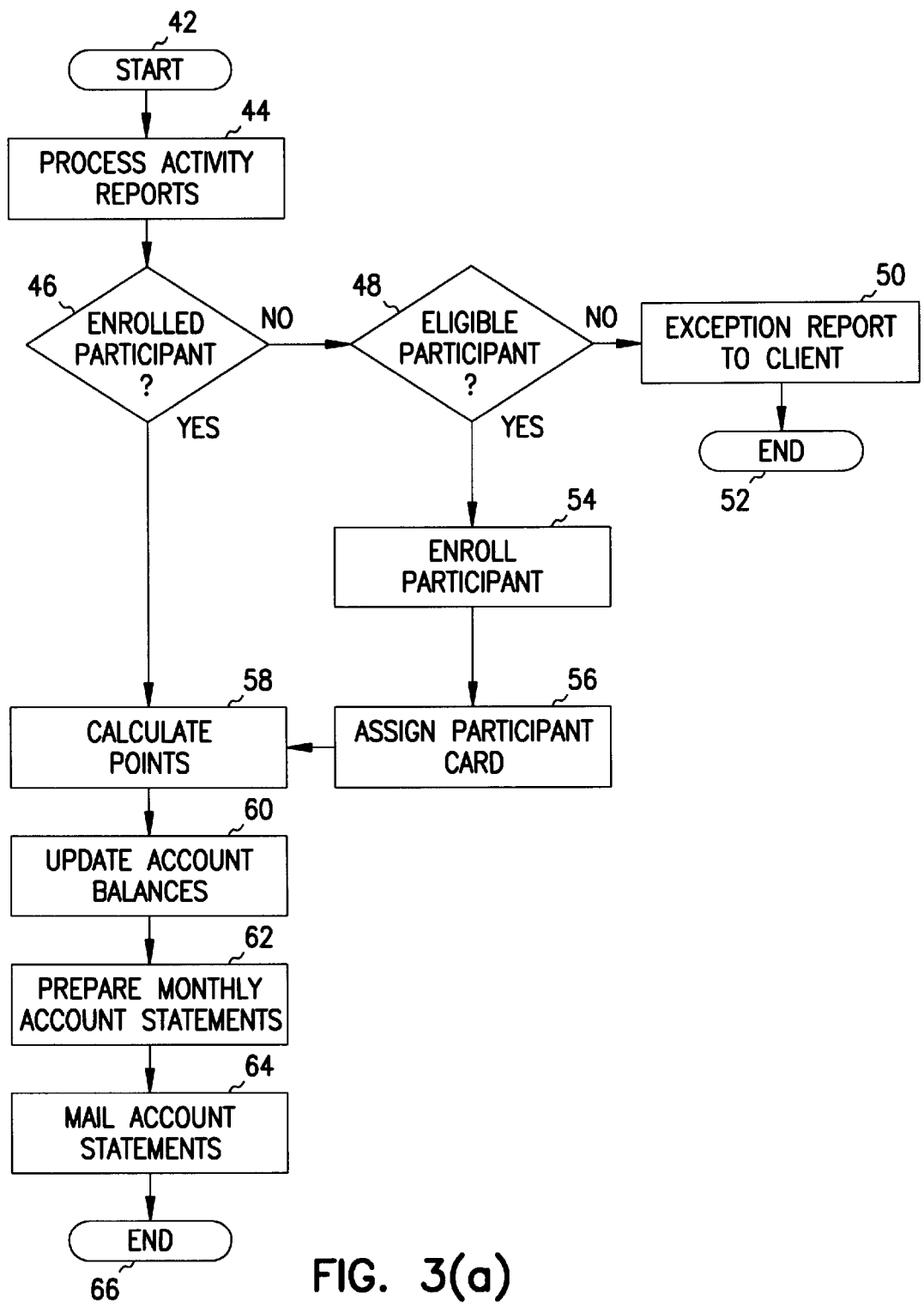
FIG. 3(a) is a flow chart showing one sub-component of a bank account component of a computerized incentive-program system according to one embodiment of the invention.

The bank account component of a computerized incentive-program system according to one embodiment of the present invention includes two sub-components, an awards calculation/issuance component and a redemption component. A flow chart effectuating an awards calculation/issuance component according to one embodiment of the present invention is shown in FIG. 3(*a*). The awards calculation/issuance component tracks an earnings balance for each of a plurality of program participants. Additional earnings are added to the award balance of a program participant upon occurrence of an event associated with the participant. For example, a salesperson selling a certain quota of goods may be eligible to receive anything in the awards album at level two. As the salesperson continues to sell more goods, their earnings increase thus, acting as an incentive to the participants to perform various events. The awards calculation/issuance component tracks the earnings and balances of each participant by a personal account number (e.g., a social security number) unique to the participant.

Starting at step 42, control proceeds to step 44, at which step an activity report is processed. The process is performed in conjunction with the computerized system for every activity report received by the administrate of the program (e.g., the incentive company). An activity report signals to the administrator that an event for which award earnings should be given to a program participant has occurred. A data operator enters at step 44 the information from the activity report into the computerized system, including the name of the individual having performed the activity that is the subject of the report.

Control proceeds from step 44 to step 46, at which step the system verifies that the individual is an enrolled participant in the program. If not, control proceeds to step 48, at which step the system determines whether the individual is eligible for enrollment. If not, control proceeds to step 50, at which step an exception report noting that an activity report has been received from an ineligible individual is generated and sent to the program sponsor, and control proceeds to and ends at step 52.

If at step 48 the individual is eligible for enrollment, control proceeds to step 54, at which step the individual is enrolled. This includes entry of information regarding the individual into the system by the data operator, such as the name, mailing address, telephone number, etc. of the individual. Control proceeds to step 56, at which step the participant is mailed a participant card having an assigned personal account number. The personal account number is unique to that individual, and allows the participant to access his or her account via a toll-free phone number, and also identifies a particular award earnings balance with the participant.

Control proceeds to step 58 from step 46, in the case where the computer system verified that the individual having performed the activity of the activity report is an enrolled participant, or from step 56, in the case where an unenrolled but eligible individual is enrolled as a participant. At step 58, the computerized system calculates the program earnings that will be added to the award balance for that participant, based on the event as disclosed in the activity report. The present invention is not limited as to the manner by which program earnings are calculated. For example, every certain dollar amount of goods sold may afford the participant a specified amount of program earnings (e.g., $10,000 of merchandise sold equals X earnings in the incentive program).

Control proceeds from step 58 to step 60, at which step the award balance of the participant is updated to reflect the amount of earnings calculated at step 58. Control proceeds to step 62, at which step account statements (such as that shown in FIG. 4) are prepared, and then mailed at step 64. The account statements include recent activity (both in terms of earnings added to the award balance as a result of event occurrences, and subtracted as a result of award redemptions). Control proceeds from step 64 to step 66, at which step the award calculation/issuance component ends.

Figure 4:
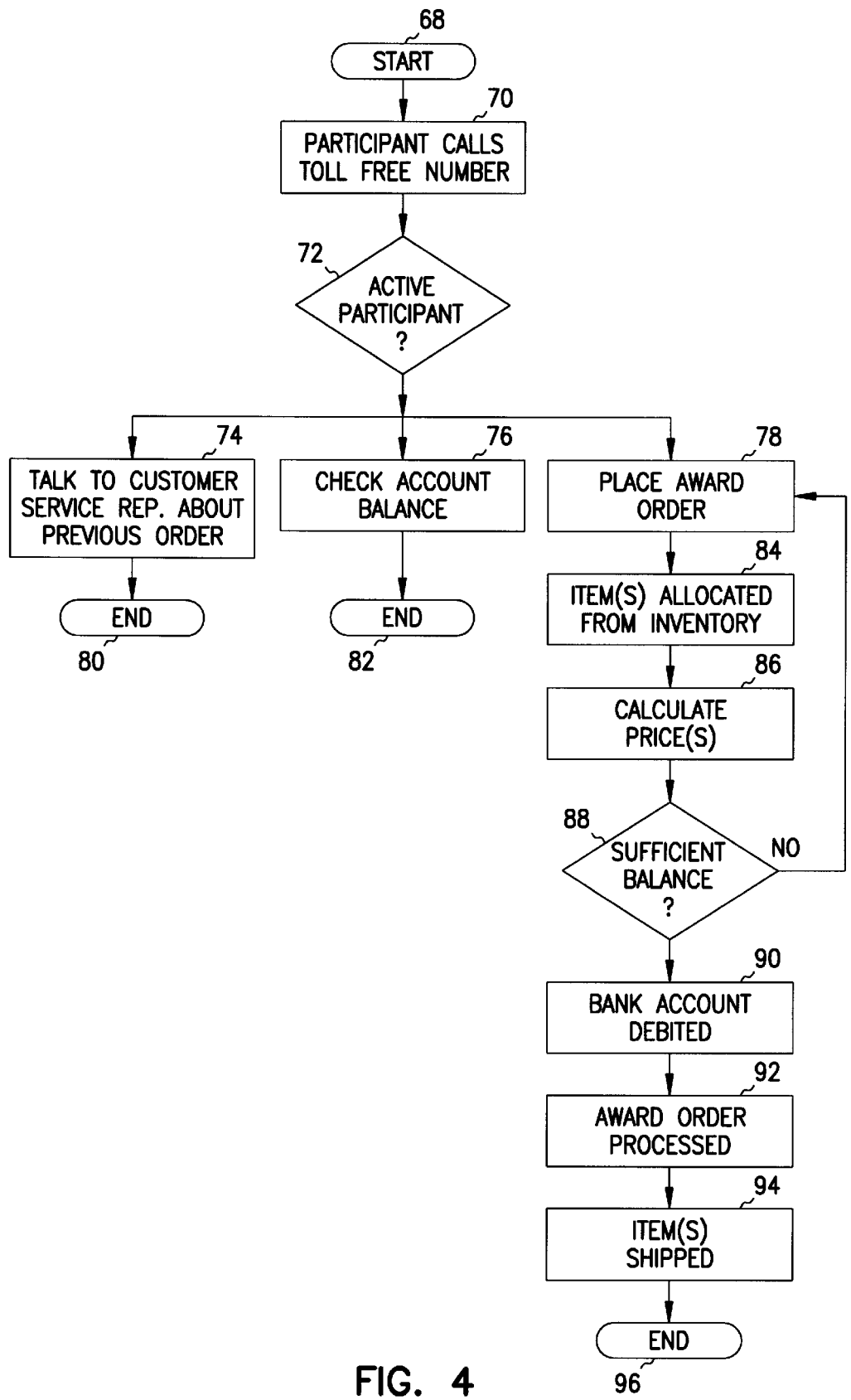
FIG. 4 is a flow chart showing another sub-component of a bank account component of a computerized incentive-program system according to one embodiment of the invention.

A flow chart effectuating a redemption component according to one embodiment of the present invention is shown in FIG. 4. The redemption component permits a program participant to redeem at least a portion of their program earnings for an award. The program participant accumulates program earnings by occurrences of events (such as reaching various sales quotas, etc.), which are added to the participant's award balance by the award calculation/issuance component. Once a participant has earned a sufficient amount for a particular award item, as shown in an awards catalog, the redemption component is invoked by the participant calling a toll-free phone number.

Starting at step 68, control proceeds to step 70, at which step the participant calls the toll-free number of the redemption center responsible for mailing awards to participants. Control proceeds from step 70 to step 72, at which step an interactive voice response (IVR) system verifies that the participant is an active participant.

If the participant chooses to speak with a customer service representative, control then proceeds from step 72 to either step 74, 76 or 78, depending on the participant's desired course of action. The computerized system displays the status screen shown in FIG. 5, so that the representative is immediately aware of to whom he or she is speaking. Control proceeds to step 74, at which step the computerized system connects a representative with the participant, after which step the redemption component ends at step 80. If the participant chooses instead to check his or her account balance (viz., award balance), control proceeds to step 76, at which step the IVR system accesses the account balance as identified by a personal account number, and states the balance to the participant, after which step the redemption component ends at step 82. If the participant chooses to place an order (i.e., redeem program earnings for an award), control proceeds to step 78.

At step 78, the participant places an award order into the computerized system. This is accomplished by the screen shown in FIG. 6 being displayed and filled out or verified by the operator. Control proceeds to step 84, at which step the computerized system determines whether the item is in stock, and allocates the item from inventory. This information is then conveyed to the operator by the screen shown in FIG. 7. Control proceeds to step 86, at which step the award level of the item is accessed by the database generated by the pricing component (i.e., at step 34 of FIG. 2). At step 88, the computerized system determines whether the award balance for that participant is sufficient to allow redemption for the desired item. If not, control reverts back to step 78, and the process starts over.

If the award balance is sufficient to allow redemption, however, control proceeds from step 88 to step 90, at which step the award balance is debited by an amount equal to that calculated at step 86. Control proceeds from step 90 to step 92, at which step the award order is processed. Processing of the award order includes final verification of all information pertaining to the order, such as is shown in the screen of FIG. 8. Control proceeds to step 94, at which step the award is delivered to the participant, and the process ends at step 96.

Certificate component

Figure 9:
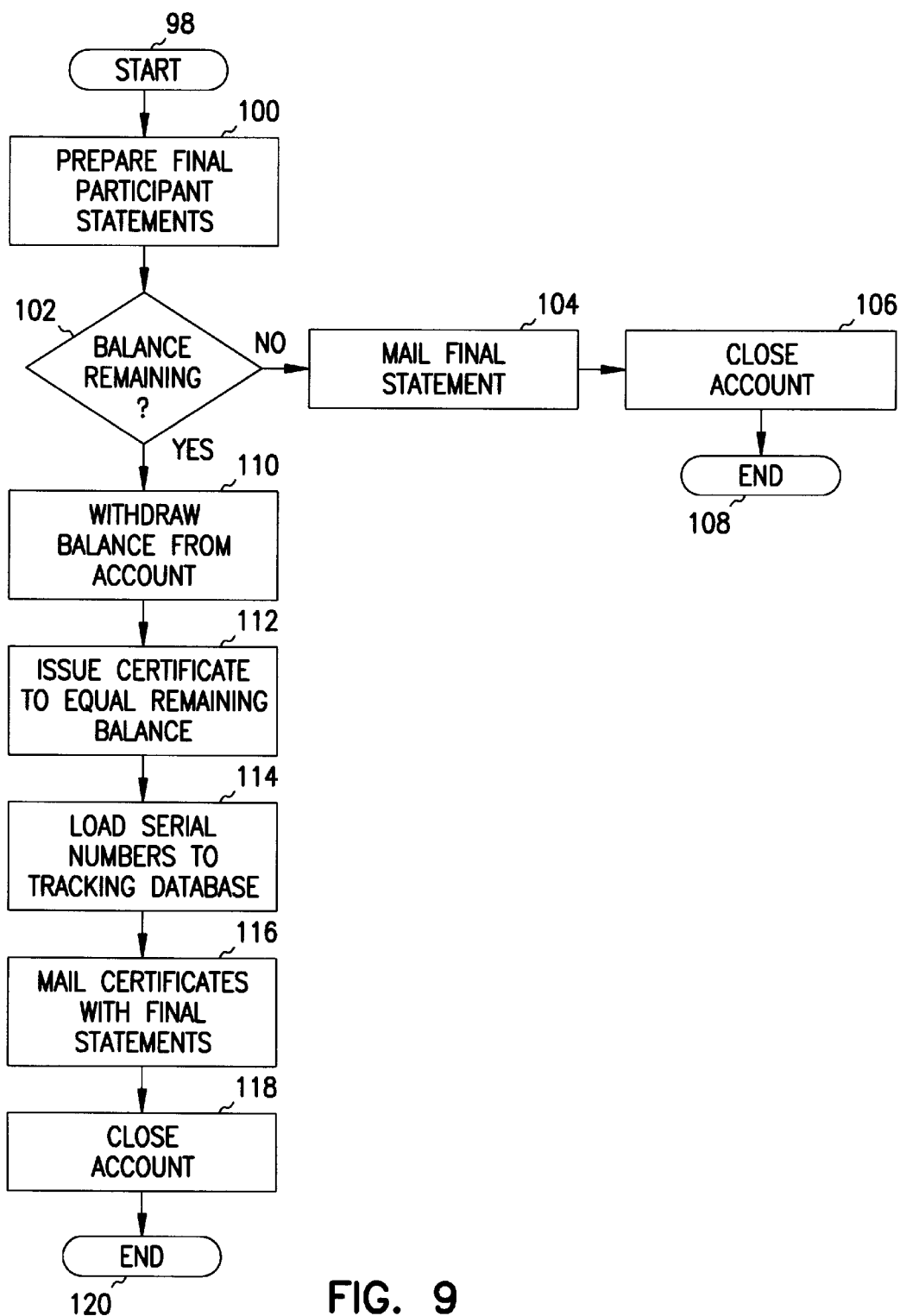
FIG. 9 is a flow chart showing one sub-component of a certificate component of a computerized incentive-program system according to one embodiment of the invention.

During the course of the incentive program, earnings are deposited, tracked and redeemed via the electronic bank account system—i.e., the bank account component just described. The computerized incentive-program system described herein also includes a certificate component, which itself includes three sub-components. These sub-components are a certificate issuance component, a certificate tracking component, and a certificate redemption component. A flow chart effectuating the certificate issuance component is shown in FIG. 9. The certificate issuance component issues a certificate to a program participant for a value of at least a portion of the award balance of the participant. In conjunction with the bank account system already described, this component is typically run when a program is over, but account balances greater than zero still exist. In such instances, certificates are issued to close out the participants electronic bank account balance. In this way, participants are still able to redeem their program earnings as memorialized in the certificates, but may not obtain any new earnings once a program is over.

Starting at step 98, control proceeds to step 100, at which step final participant statements (such as that shown in FIG. 2) are prepared by the computerized system. Control then proceeds to step 102, at which step the computerized system determines whether an award balance remains for each participant. If no balance remains for a given participant, control proceeds to step 102, at which step the final statement is mailed, then to step 104, at which step the account is closed, and then to step 106, at which step the certificate issuance component ends as to that participant. If, however, at step 102 there is a balance remaining for a particular participant, control proceeds from step 102 to step 110.

At step 110, the computerized system withdraws the award balance from the account, and control proceeds to step 112. At step 112, the system issues a certificate equal to the balance that had been remaining in the account. The certificate includes a unique serial number; this permits for later tracking of the certificate after it has been mailed to the participant. Control proceeds to step 114, at which step the serial numbers of all issued certificates are loaded into a tracking database, for later access by the computerized system (e.g., when a certificate is redeemed). Control proceeds to step 116, at which step certificates are mailed along with the final statements generated at step 100, and then to step 118, at which step the accounts are closed. The certificate issuance component ends at step 120.

Figure 10:
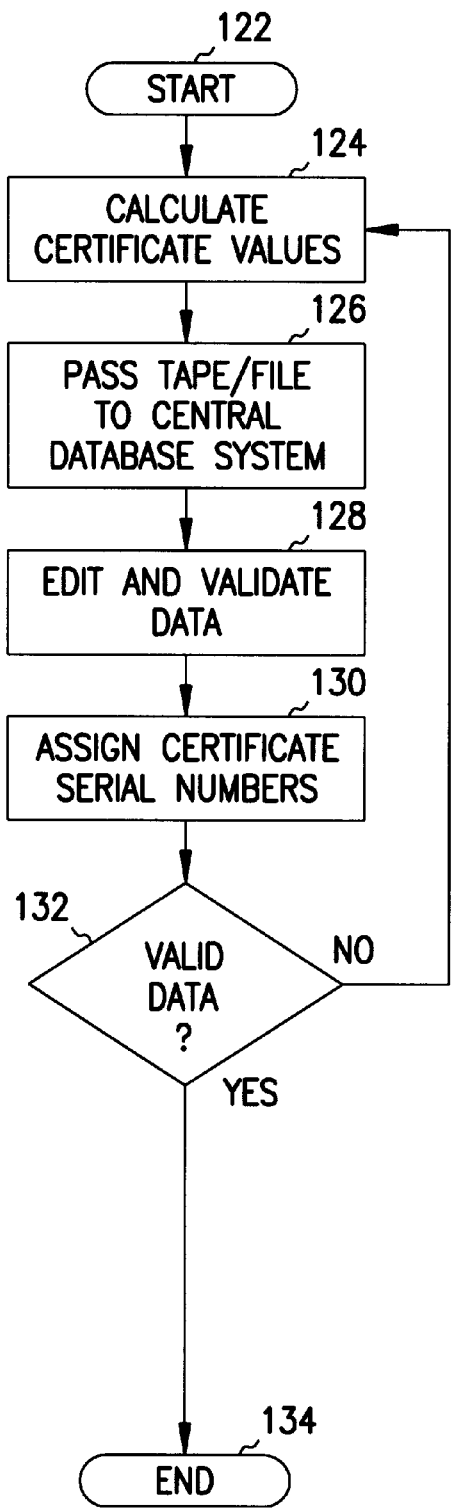
FIG. 10 is a flow chart showing another sub-component of a certificate component of a computerized incentive-program system according to one embodiment of the invention.

A flow chart effectuating the certificate tracking component is shown in FIG. 10. The certificate tracking component tracks an award value for each of the certificates by the serial number of the certificate. The certificate tracking component actually generates the certificates (including serial number thereof) which are then issued (sent) by the certificate issuance component. The tracking component thus provides for the serial number of a certificate as corresponding to a given certificate value, which the issuance component then issues (sends) and loads onto the tracking database.

Starting at step 122, control proceeds to step 124, at which step the award values for the certificates are calculated. These award values are determined based on the award balances remaining in various accounts, such as those at step 112 of FIG. 9. Control proceeds to step 126, at which step the file on which this information is stored is transferred to a central system (a part of the computerized incentive-program system) for further processing. The processing performed by the central database system includes steps 128, 130 and 132.

Control proceeds to step 128 from step 126, at which step an analyst edits and validates the data in interaction with the central database. This involves ensuring that the award values for the certificates are indeed correct, and that no errors were introduced in the process of moving the data to the central database system. If there are any errors, they are corrected by the analyst by editing the data. Control then proceeds to step 130, at which step the central database system assigns a unique certificate serial number for each certificate. The serial number permits identification of the certificate during activities such as redemption, without requiring the physical presence of the certificate. At step 130, each certificate is also printed.

Control proceeds from step 130 to step 132, at which step the data is once again checked by the analyst to ensure that the data is valid, in interaction with the central database. Validation of the data that will be printed on issued certificates is critical. Any errors that are introduced, could potentially cause disastrous results for the program sponsor and/or the incentive company administering the incentive program. The certificate tracking component ends at step 134.

The certificate issuance component of FIG. 9 and the certificate tracking component of FIG. 10 thus interact with one another. The certificate tracking component ensures that the certificates, as identified by serial number and as having a particular award value, are valid. Two check points (at steps 128 and 132) ensure that this is the case. The certificate issuance component only issues certificates to participants that have first been "tracked" by the certificate tracking component. That is, the issuance component only issues certificates that have had serial numbers assigned and award values set by the tracking component (although in the case where the issuance component is closing an account, the award value is set by the tracking component as dictated by the issuance component).

Figure 11:
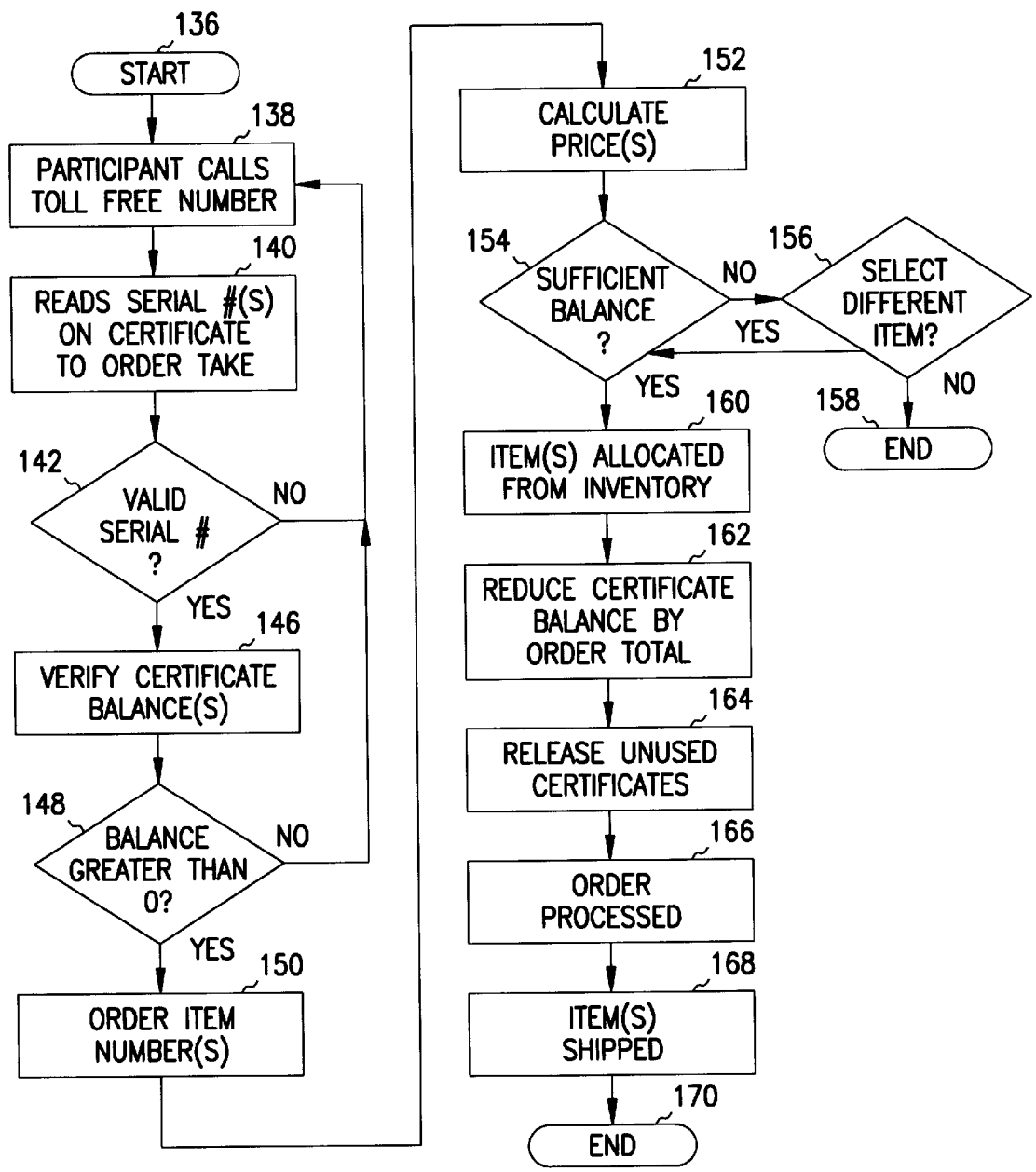
FIG. 11 is a flow chart showing a third sub-component of a certificate component of a computerized incentive-program system according to one embodiment of the invention.

A flow chart effectuating a certificate redemption component is shown in FIG. 11. The certificate redemption component permits a program participant to remotely redeem at least a portion of the award value of a certificate for an award by identifying the serial number of the certificate. The participant does not have to physically mail in the certificate to a redemption center. Because the certificate has a serial number, the participant only has to read the number to an operator over the phone.

Starting at step 136, control proceeds to step 138, at which step the participant calls a toll-free phone number to redeem a certificate (or a portion thereof) for an award. Control proceeds to step 140, at which step the participant reads the serial number of the certificate to the operator at the redemption center. The operator enters this information into the computerized system. Control proceeds to step 142, at which step the computerized system verifies that the serial number is valid. The system performs this verification by accessing the tracking database into which the serial number was loaded (i.e., at step 114 of FIG. 9). If the serial number is valid, control proceeds to step 146, else control returns to step 140.

At step 146, the computerized system further verifies that there is an award balance for that particular certificate. The computerized system provides for the partial redemption of the value of a certificate. For example, a participant is able to redeem a portion of their certificate balance for a merchandise item, and then leave the remaining award balance for travel at a later date. This is an advantage of the present invention; mailing in the certificate, by contrast, requires an all-or-nothing redemption of the certificate. In conjunction with step 146, the computerized system displays to the operator a balance screen such as that shown in FIG. 12. Control proceeds to step 148, at which step control proceeds to step 150 if the balance verified in step 146 is greater than zero, or reverts back to step 140 if the balance was equal to zero.

At step 150, the participant places an award order into the computerized system. This is accomplished by the stating of the item number for the desired award by the participant to the operator. Control proceeds to step 152, at which step the award level of the item is calculated by access to the database generated by the pricing component (i.e., at step 34 of FIG. 1), or a similar predefined database. At step 154, the computerized system determines whether the award balance for the certificate is sufficient to allow redemption for the desired item. If not, the participant is permitted to select a different award at step 156. If the participant chooses not to do so, the certificate redemption component ends at step 158. If the participant chooses to select another award, that control reverts back to step 154.

Once the participant has selected an award item for which there is a sufficient balance on the certificate to allow redemption, control proceeds to step 160. At step 160, the computerized system allocates the item from inventory. Control proceeds to step 162, at which step the award balance for the certificate is reduced by the amount redeemed for the award, and then to step 164, at which step the system releases the unused value of the certificate for later redemption. The transactions made in conjunction with an award balance of a particular certificate are shown to the operator on a screen such as that shown in FIG. 13. Control proceeds to step 166, at which step the award order is processed. Processing of the award order includes final verification of all information pertaining to the order. The item is shipped at step 168, and the certificate redemption component ends at step 170.

As has been described, the certificate issuance, tracking, and redemption components provide for remote redemption of a certificate. A participant must only call in a serial number of the certificate in order to redeem the certificate for an award. The participant does not have to physically mail in the certificate to a redemption center, which typically introduces delay into the redemption process. Furthermore, by permitting for tracking of a certificate by serial number, the present invention permits partial redemption of a certificate, which is not possible if the certificate must be mailed.

Conclusion

A computerized incentive program system has been described. In an exemplary embodiment, the system comprises a pricing component, a bank account component, and a certificate component. The bank account component comprises two sub-components in one embodiment, an awards calculation/issuance component and a redemption component. The certificate component comprises three sub-components in one embodiment, a certificate issuance component, a certificate tracking component, and a certificate redemption component. Those of ordinary skill within the art will readily appreciate that many changes and modifications to the above drawings and description can be made without departure form the spirit or scope of the following claims. For example, the certificate issuance and tracking components have been shown and described to divide between the two components various functionality with respect to certificates. However, modification of the present invention so that some of the functionality of one of the components is instead performed by others is within the scope of the following claims.

I claim:

1. A computerized incentive program system comprising:
   a pricing component to convert a price of each of a plurality of awards into a number of award levels such that each price within a particular price range is converted to an award level;
   a bank account component, operatively coupled to the pricing component, comprising:
      an award calculation/issuance component to track an award balance for each of a plurality of program participants; and,
      a redemption component operatively coupled to the award calculation/issuance component to permit a program participant to redeem at least a portion of the award balance of the participant for an award; and,
   a certificate component, operatively coupled to the bank account component, comprising:
      a certificate issuance component to issue a certificate to a program participant for a value of at least a portion of the award balance of the program participant upon conclusion of the incentive program;
      a certificate tracking component operatively coupled to the certificate issuance component to track the value of the certificate by a serial number of the certificate; and,
      a certificate redemption component operatively coupled to the certificate tracking component to permit the program participant to remotely redeem at least a portion of the value of the certificate for an award by identifying the serial number of the certificate.

2. The computerized incentive program system of claim 1, wherein earnings are added to the award balance of a program participant upon occurrence of an event associated with the program participant.

3. The computerized incentive program system of claim 1, wherein the award calculation component tracks an award balance for each of a plurality of program participants by a personal account number unique to each program participant.

4. A computerized incentive program system comprising:
   a pricing component to convert a price of each of a plurality of awards into a number of award levels such that each price within a particular price range is converted to an award level;
   a bank account component operatively coupled to the pricing component to track an award balance for each of a plurality of participants and permit each participant to redeem at least a portion of the award balance for an award; and, a certificate issuance component operatively coupled to the bank account component to permit a program participant to remotely redeem a certificate having a value of at least a portion of the award balance by identifying a serial number unique to the certificate, upon conclusion of the incentive program.

5. The computerized incentive program system of claim 4, wherein earnings are added to the award balance of a program participant upon occurrence of an event associated with the program participant.

6. The computerized incentive program system of claim 4, wherein the bank account component tracks an award balance for each of a plurality of program participants by a personal account number unique to each program participant.

7. The computerized incentive program system of claim 4, wherein the bank account component comprises:

an award calculation/issuance component to track an award balance for each of a plurality of program participants; and, a redemption component operatively coupled to the award calculation/issuance component to permit a program participant to redeem at least a portion of the award balance of the participant for an award.

8. The computerized incentive program system of claim 4, wherein the certificate component comprises:

a certificate issuance component to issue a certificate to a program participant for a value of at least a portion of the award balance of the program participant upon conclusion of the incentive program;

a certificate tracking component operatively coupled to the certificate issuance component to track the value of the certificate by a serial number of the certificate; and, a certificate redemption component operatively coupled to the certificate tracking component to permit the program participant to remotely redeem at least a portion of the value of the certificate for an award by identifying the serial number of the certificate.

9. A computer-implemented method for converting a price of each of a plurality of awards to a number of award levels, in conjunction with a computerized incentive program system having at least a bank account component and a certificate component, the method comprising the steps of:

categorizing each award by price into one of a plurality of price ranges;

assigning each award to an award level according to the price range into which the award has been categorized;

loading the award level for each award into a database stored on a computerized storage system, wherein each award within a particular price range has an award level; and a certificate issuance component operatively coupled to the bank account component to permit a program participant to remotely redeem a certificate having a value of at least a portion of the award balance by identifying a serial number unique to the certificate, upon conclusion of the incentive program.

10. The method of claim 9, further comprising the step of verifying that each award represents a good value as compared to other items in the award level assigned to the award.

11. The method of claim 9, further comprising the step of verifying that each award represents an acceptable gross margin as compared to the award level assigned to the award.

12. A computer-implemented method for permitting a program participant to remotely redeem at least a portion of an award value of a certificate for an award, in conjunction with a computerized incentive program system having at least a bank account component, the method comprising the steps of:

obtaining from the program participant a serial number of the certificate;

comparing the serial number of the certificate against a database stored on a computerized storage system to verify that the certificate is valid;

obtaining from the program participant an item number of an award, wherein the award is selected from a plurality of awards, such that a price of each of the plurality of awards is converted into a number of award levels and such that each price within a particular price range is converted to an award level;

reducing the award value of the certificate by the award value associated with the award; and, a certificate issuance component operatively coupled to the bank account component to permit a program participant to remotely redeem a certificate having a value of at least a portion of the award balance by identifying a serial number unique to the certificate, upon conclusion of the incentive program.

13. A computer comprising:

at least one processor;

at least one memory, operatively coupled to the processor;

means for converting a price of each of a plurality of awards into a number of award levels such that each price within a particular price range is converted to an award level;

means for tracking an award balance for each of a plurality of program participants;

means for permitting a program participant to redeem at least a portion of the award balance of the participant for an award;

means for issuing a certificate to a program participant for a value of at least a portion of the award balance of the program participant upon conclusion of the incentive program;

means for tracking the value of the certificate by a serial number of the certificate;

means for permitting the program participant to remotely redeeming at least a portion of the value of the certificate for an award by identifying the serial number of the certificate.

* * * * *